United States Patent
Spivak et al.

(10) Patent No.: US 7,613,726 B1
(45) Date of Patent: Nov. 3, 2009

(54) FRAMEWORK FOR DEFINING AND IMPLEMENTING BEHAVIORS ACROSS AND WITHIN CONTENT OBJECT TYPES

(75) Inventors: Victor Spivak, San Mateo, CA (US);
Meir Amiel, Pleasanton, CA (US);
David Allan Buccola, Pleasanton, CA (US)

(73) Assignee: EMC Corporation, Hopkinton, MA (US)

( * ) Notice: Subject to any disclaimer, the term of this patent is extended or adjusted under 35 U.S.C. 154(b) by 505 days.

(21) Appl. No.: 11/391,608

(22) Filed: Mar. 27, 2006

(51) Int. Cl.
*G06F 17/30* (2006.01)

(52) U.S. Cl. .................. 707/103 R; 707/103 Y; 707/103 Z; 719/328

(58) Field of Classification Search .. 707/103 R–103 Z; 719/328
See application file for complete search history.

(56) References Cited

U.S. PATENT DOCUMENTS

| | | | |
|---|---|---|---|
| 6,208,994 B1 * | 3/2001 | Abdelnur | 707/103 R |
| 7,370,335 B1 * | 5/2008 | White et al. | 719/328 |
| 2007/0088740 A1 * | 4/2007 | Davies et al. | 707/103 R |

OTHER PUBLICATIONS

U.S. Appl. No. 11/370,421, Kilday et al.

* cited by examiner

*Primary Examiner*—Debbie M Le
(74) *Attorney, Agent, or Firm*—Van Pelt, Yi & James LLP

(57) ABSTRACT

A framework for defining and implementing behaviors across and within content object types is disclosed. An indication is received that a behavior that is not a default behavior associated with all content items or a default behavior of content items of a type with which a content item is associated is to be provided with respect to the content item. An implementation object instance associated with the content item is configured to provide the behavior.

27 Claims, 12 Drawing Sheets

FRAMEWORK FOR DEFINING AND IMPLEMENTING BEHAVIORS ACROSS AND WITHIN CONTENT OBJECT TYPES

BACKGROUND OF THE INVENTION

Within a body of managed content, from time to time the need arises to enforce a behavior with respect to and/or associate an attribute or other data with one or more items of managed content, e.g., a related set of managed content items, such as those subject to the same retention requirements and/or access restrictions, those associated with a particular collaboration or project, or those to be published to the same destination, such as a web page. Traditionally, such behaviors have been imposed by writing custom, application level code. However, that approach puts a burden on the application developer, is susceptible to error on the part of the application developer, and may break down if it is desired to impose the behavior and/or associate the attribute across two or more different applications, especially if the applications are from different sources and/or developers.

Facilities to apply type-based behaviors without relying on application level code, e.g., through methods and/or attributes associated with all content items of a particular type, have been provided. But in some cases, it would be useful to associate a method and/or attribute to content items of dissimilar types, or to only a subset of items of a particular type. Therefore, there is a need for a way to associate a method and/or attribute with one or more content items of dissimilar types and/or comprising only a subset of items of a particular type.

BRIEF DESCRIPTION OF THE DRAWINGS

Various embodiments of the invention are disclosed in the following detailed description and the accompanying drawings.

DETAILED DESCRIPTION

Figure 1:
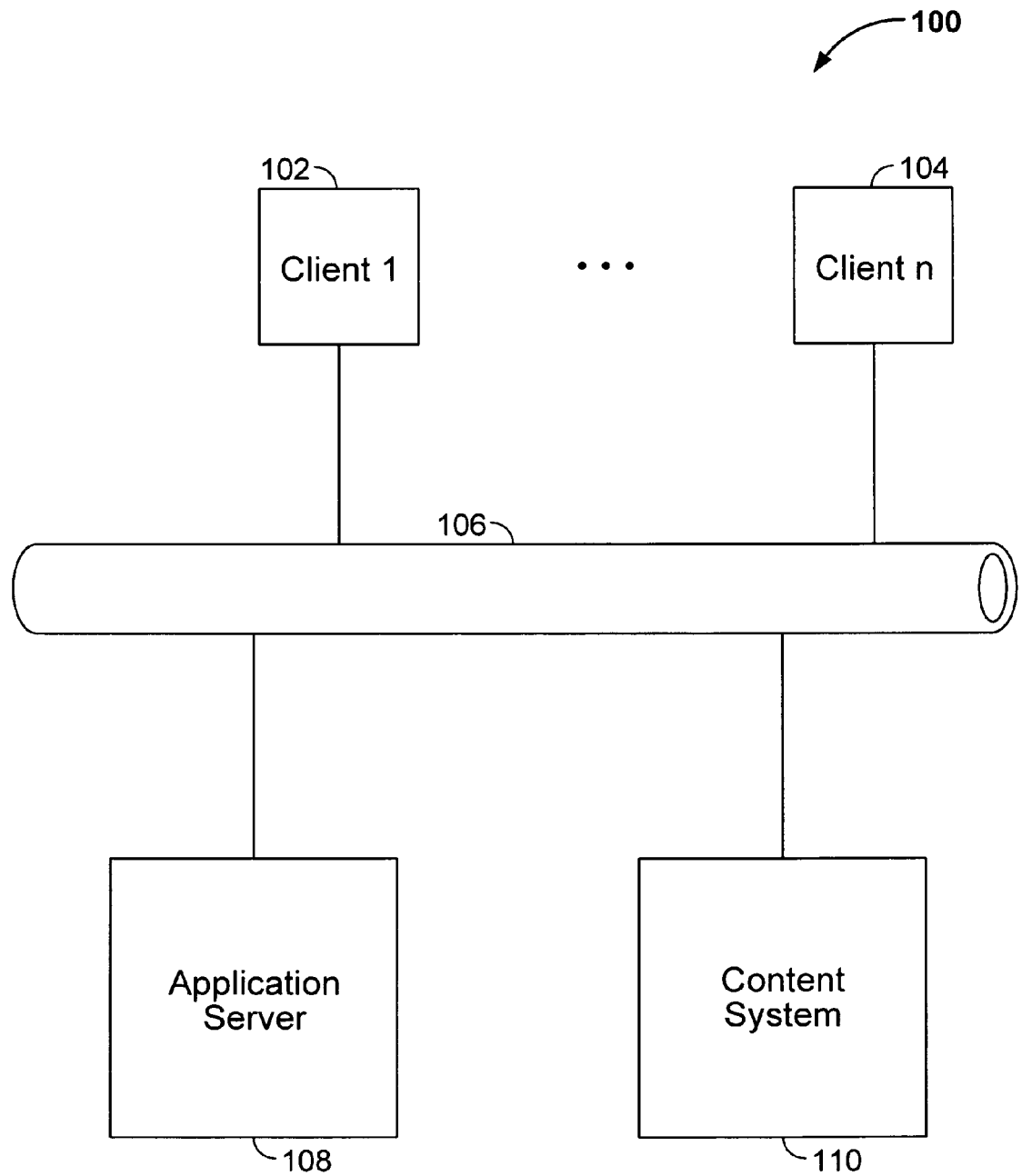
FIG. 1 is a block diagram illustrating an embodiment of a system for accessing and using managed content.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A framework for defining and implementing behaviors across and within content object types is disclosed. In some embodiments, a definition of a behavior, e.g., one or more methods and/or attributes, to be applied to one or more items of managed content, regardless of content type, is received. The definition defines the behavior, e.g., in the form of one or more methods and/or attributes to be associated with a content item to which the behavior is attached. An indication is received that the behavior is to be attached to an item of managed content. In various embodiments, the indication may be explicit (e.g., a user, application, or other process specifically directing that the behavior be attached) or implicit (e.g., triggered by a related explicit action, an event in a business process, arrival of a point in a lifecycle of the content item, an application event or context, etc.). The behavior is attached, e.g., by modifying or re-instantiating an object used to represent the content item within a body of managed content to include the behavior—e.g., by modifying, limiting, and/or extending an existing method of the original object; adding or deleting a method; and/or modifying, adding, or deleting an attribute—and/or by linking to the object one or more other objects configured to implement the behavior and/or ensure the behavior is implemented with respect to the content item.

FIG. 1 is a block diagram illustrating an embodiment of a system for accessing and using managed content. One or more clients, represented in the example shown in FIG. 1 by client 102 and client 104, communicate via a network 106, such as a local area network (LAN), with an application server 108, e.g., to access and use an application running on application server 108. In some embodiments, application server 108 hosts one or more applications running on a content management framework or platform associated with managed content to which access is provided via a content system 110. In the example shown, application server 108 communicates via network 106 with content system 110 to access and/or store content items associated with content system 110.

Figure 2:
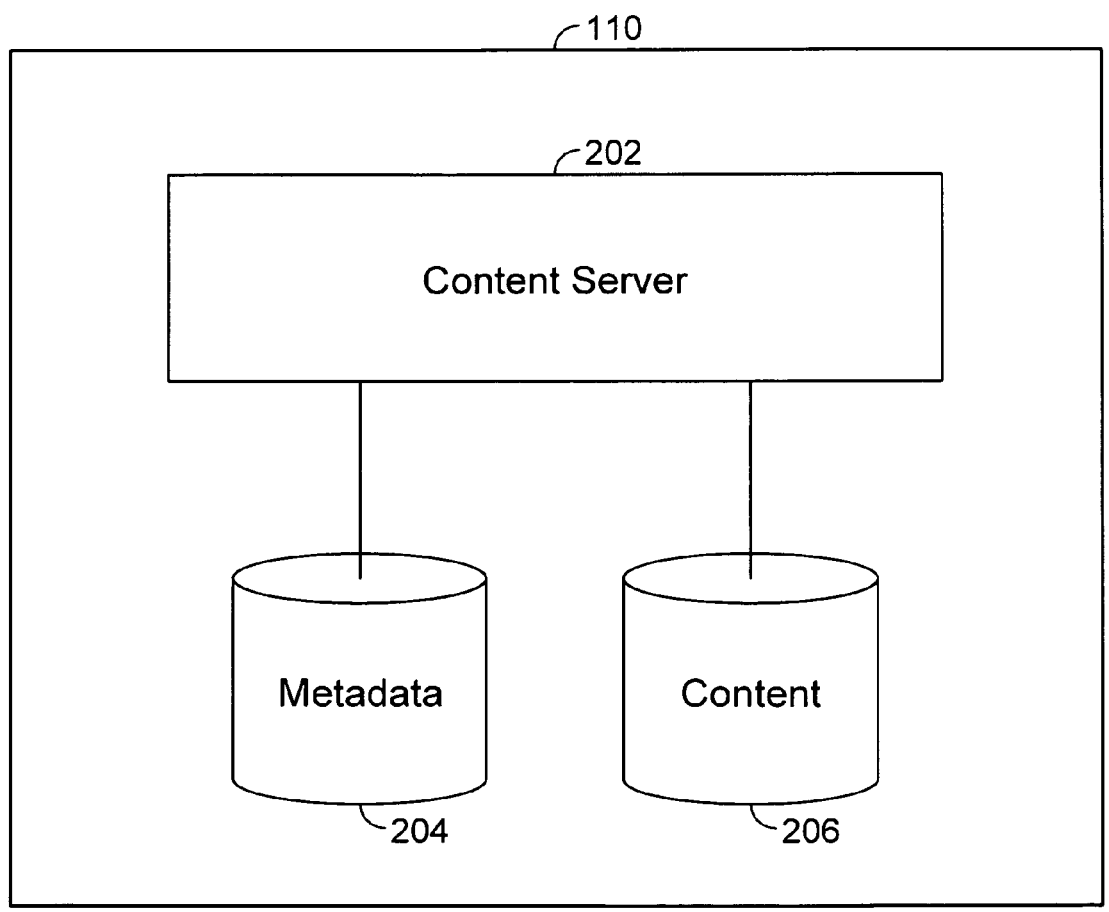
FIG. 2 is a block diagram illustrating an embodiment of a content system.

FIG. 2 is a block diagram illustrating an embodiment of a content system. In the example shown, content system 110 includes a content server 202 configured to provide access to and/or store content items, e.g., files, database tables, etc., stored in content store 206. In various embodiments, content server 202 and content store 206 reside on the same or different physical devices and/or systems, such as on separate servers or other computers. Content server 202 manages content items stored in content store 206 at least in part by associating with each of at least a subset of the content items stored in content store 206 corresponding metadata stored in metadata store 204. In some embodiments, the metadata is stored in the form of one or more software objects configured and used to represent an associated content item within a body of managed content. Examples of metadata include content item owner, author, title, date created, date last accessed, version, content type, file or data format, authoring application, recipient, sender, relationship to other content item(s), keyword(s), etc. In some embodiments, content server 202 uses the metadata to manage (e.g., track) and provide managed access to associated content items, e.g., by executing and returning results for metadata and/or full-text index based queries and providing content management functions such as check-in/check-out, versioning, save, delete, etc.

In some embodiments, one or more objects to represent a content item in metadata store 204 are created by and/or in response to a request from an application running on an associated content management framework (e.g., foundation classes, business logic, and/or API). For example, an application may populate and/or provided data values for metadata object attributes and/or provide the associated content and/or indicate to the content server a location (e.g., on the application server and/or an associated client) where the content is located. The content server stores the content in content store 206 and associates the content as stored in content store 206 with the corresponding metadata in metadata store 204.

Figure 3:
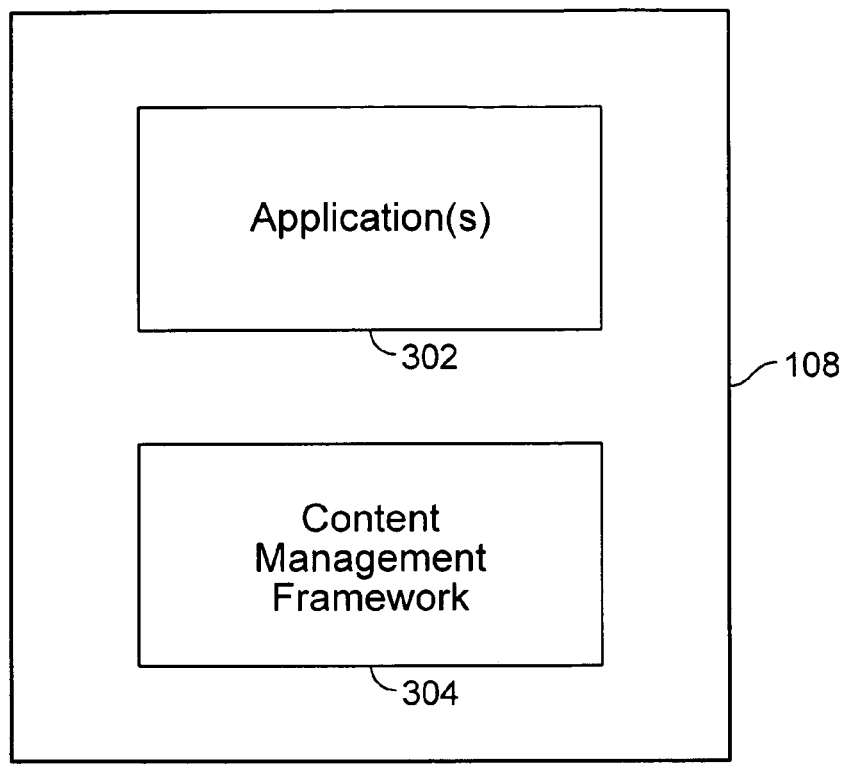
FIG. 3 is a block diagram illustrating an embodiment of an application server.

FIG. 3 is a block diagram illustrating an embodiment of an application server. In the example shown, application server 108 includes one or more applications 302 running on a content management framework 304. The application(s) use(s) the content management framework 304, e.g., an API, foundation Java classes, core content management logic and/or services, etc., to store and access managed content.

Figure 4:
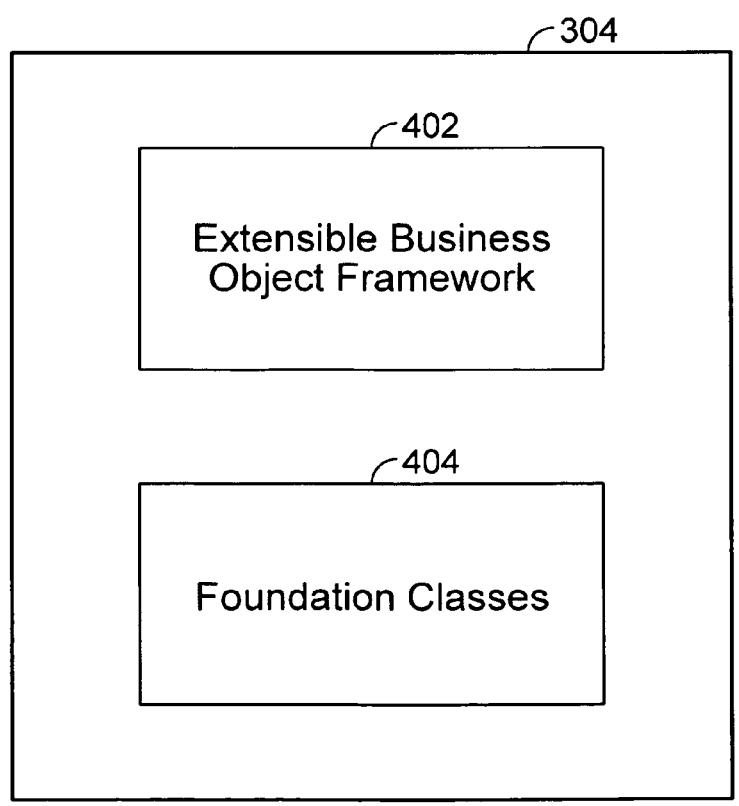
FIG. 4 is a block diagram illustrating an embodiment of a content management framework.

FIG. 4 is a block diagram illustrating an embodiment of a content management framework. In the example shown, content management framework 304 includes an extensible business object framework 402 and foundation (e.g., Java object) classes 404. In some embodiments, the business object framework 402 comprises part of foundation classes 404. The business object framework 402 in some embodiments enables an application developer, application or other code, or another user to define type-based methods and/or attributes to be associated with content of a particular type. In some embodiments, type-based behaviors are implemented as methods and/or attributes that extend, modify, or replace the methods and attributes of a base implementation object configured and used to represent non-typed content items within a body of managed content. In some embodiments, the business object framework includes one or more mechanisms usable by an application developer or other user to define and configure the rules for the attachment/removal of non-type-based behaviors, such as behaviors (e.g., methods, attributes, and/or logic) to be applied by and/or with respect to items of managed content regardless of and/or across type and/or to a subset of content items of one or more types.

Figure 5:
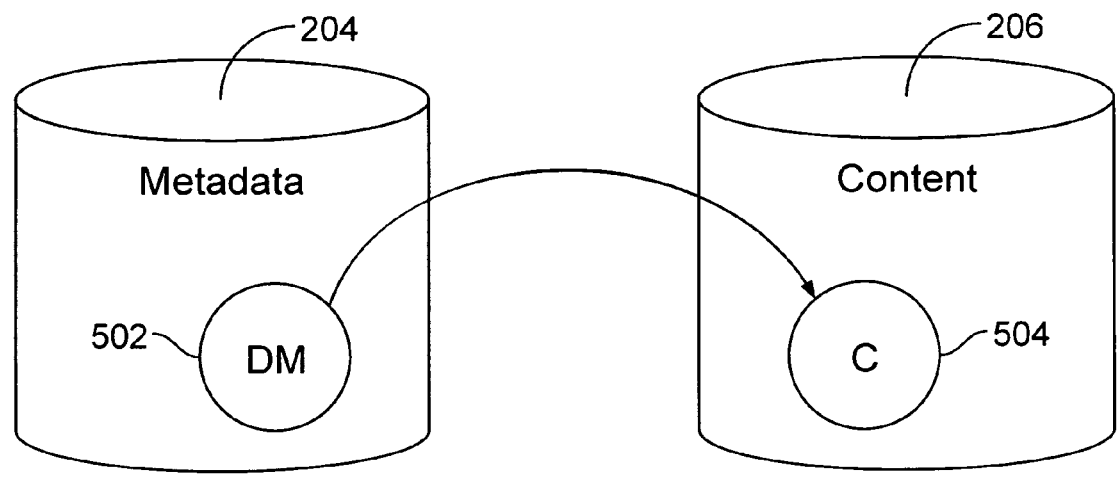
FIG. 5 is a block diagram illustrating an embodiment of elements associated with a content system.

FIG. 5 is a block diagram illustrating an embodiment of elements associated with a content system. In the example shown, an implementation object 502 stored in metadata store 204 is associated with a corresponding content item 504 stored in content store 206. The implementation object 502 represents the content item 504 in a body of managed content with which both are associated. FIG. 5 illustrates a simple example in which there is a one-to-one relationship between implementation object 502 and content item 504, but in some embodiments a single implementation object (or related set of objects) may be associated with two or more content items and/or a single content item may be associated with two or more implementation objects (e.g., to avoid duplicative storage of content). In some embodiments, a behavior is associated with a content item, regardless of and/or across content type and/or within a subset of a content type, at least in part by modifying, replacing, or extending an implementation object, such as implementation object 502 of FIG. 5, associated with the content item. In some embodiments, an implementation object such as implementation object 502 of FIG. 5 is instantiated based at least in part on a generic (not type specific) or content type-specific system object class. In some embodiments, type-based behavior and/or behavior attached on a basis other than (solely) content type is associated with a content item by extending (e.g., modifying, replacing, or supplementing) the methods and/or attributes of a generic implementation object class and/or by extending methods and/or attributes of previously implemented type-based and/or attached behaviors. In some embodiments, the object having the extended (e.g., type-based or attached) behavior is defined and/or saved as a new class of object, to enable similar objects to be instantiated in the future. In other embodiments, to avoid proliferation of the number of classes to be stored and managed, a new class is not defined and saved for each observed combination of generic, type-based, and attached behaviors.

Figure 6:
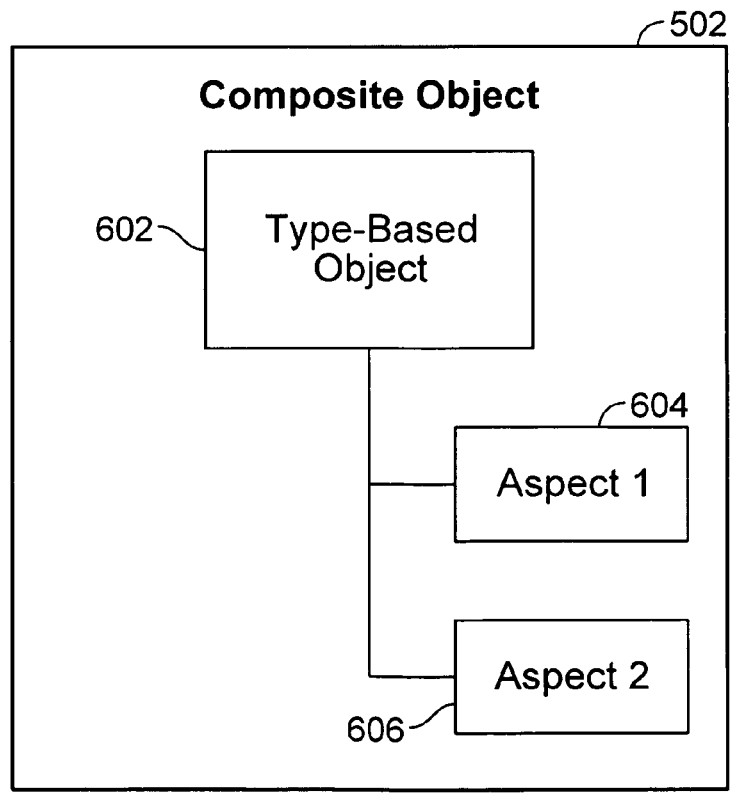
FIG. 6 is a block diagram illustrating an embodiment of a composite implementation object used to associate type-based and/or attached behaviors with an item of content.

FIG. 6 is a block diagram illustrating an embodiment of a composite implementation object used to associate type-based and/or attached behaviors with an item of content. In the example shown, a generic implementation object has been used to create a composite object 502 that extends (modifies, replaces, supplements, etc.) the behavior of a generic implementation object by adding type-based object behaviors 602 (methods and/or attributes) and attached behaviors, referred to in the figures as aspects and represented in the example shown by aspect 1 (604) and aspect 2 (606). In this example, content items of a type with which the content item represented by the composite object 502 is associated share the type-based behaviors 602, unless modified or supplanted by an attached behavior (aspect) that has dominance over the type-based behaviors. In some embodiments, attached aspects always dominate type-based behaviors on the theory they are more specific to a particular instance than type-based behaviors. In some embodiments, whether an aspect will dominate (take precedence over) a type-based behavior is configurable, e.g., by indicating such dominance in a definition of the aspect. In some embodiments, dominance and/or conflict resolution is realized at least in part by applying type-based and attached behaviors to a generic implementation object in an order that ensure the dominant behavior is enforced. In the example shown in FIG. 6, the composite object has been formed by adding the type-based behavior first; the first aspect (604) extends the type-based object and the second aspect (606) extends the first aspect. In some embodiments, a service or other content management platform logic responsible at least in part for attaching aspects to content items is configured to ensure aspects are attached in a manner that realizes the correct dominance. In some embodiments, such platform logic prevents incompatible aspects from being attached. In some embodiments, a designer of the aspect indicates whether and/or which other behaviors, e.g., other aspects, it dominates and/or with which other aspects and/or types of aspect the new aspect is incompatible. In some embodiments, an action that would otherwise explicitly or implicitly cause an aspect to be attached to an object with which the aspect is incompatible, or with respect to which there is an ambiguity about whether it is incompatible and/or which is dominant (e.g., circular dominance rules), results in an exception, e.g., generating an error message or logging an event.

In some embodiments, an aspect or other behavior may be attached to an instance of an implementation object representing a content item in a body of managed content either at instantiation or later. In some embodiments, an aspect is attached at least in part by performing byte manipulation with respect to an implementation object being instantiated (and/or previously instantiated) to represent and/or manage the content item. In some embodiments, an aspect is attached at least in part by setting an attribute value and/or linking to an implementation object associated with the content item an object configured to ensure the attached behavior is implemented and/or enforced. In some embodiments, an attached behavior (aspect) may be removed, e.g., in response to an action or event that explicitly or implicitly indicates the attached behavior should be removed.

In some embodiments, attaching or removing an aspect or other attached behavior subsequent to original instantiation of an implementation object to represent and/or manage a content item is realized at least in part by re-instantiating the implementation object with the aspect added or removed, as applicable. In some embodiments, a user handle (e.g., proxy object) associated with the implementation object and provided previously to users, such as applications, of the content item is retained in the case of such re-instantiation and the newly instantiated implementation object is associated with the previously provided handle. In some embodiments, a second (or third, etc.) proxy is instantiated, if necessary, to expose and implement any new interface(s) associated with a newly attached aspect, and an application or other process/user that needs to use the new interface does so through the newly added proxy, while other applications continue to interact with a previously configured proxy to access methods, etc. not dependent on the new interface. In many cases, it is anticipated that an attached aspect will extend existing methods and attributes and new interfaces will not be required, in which case in some embodiments no new (added) proxy is created.

Figure 7:
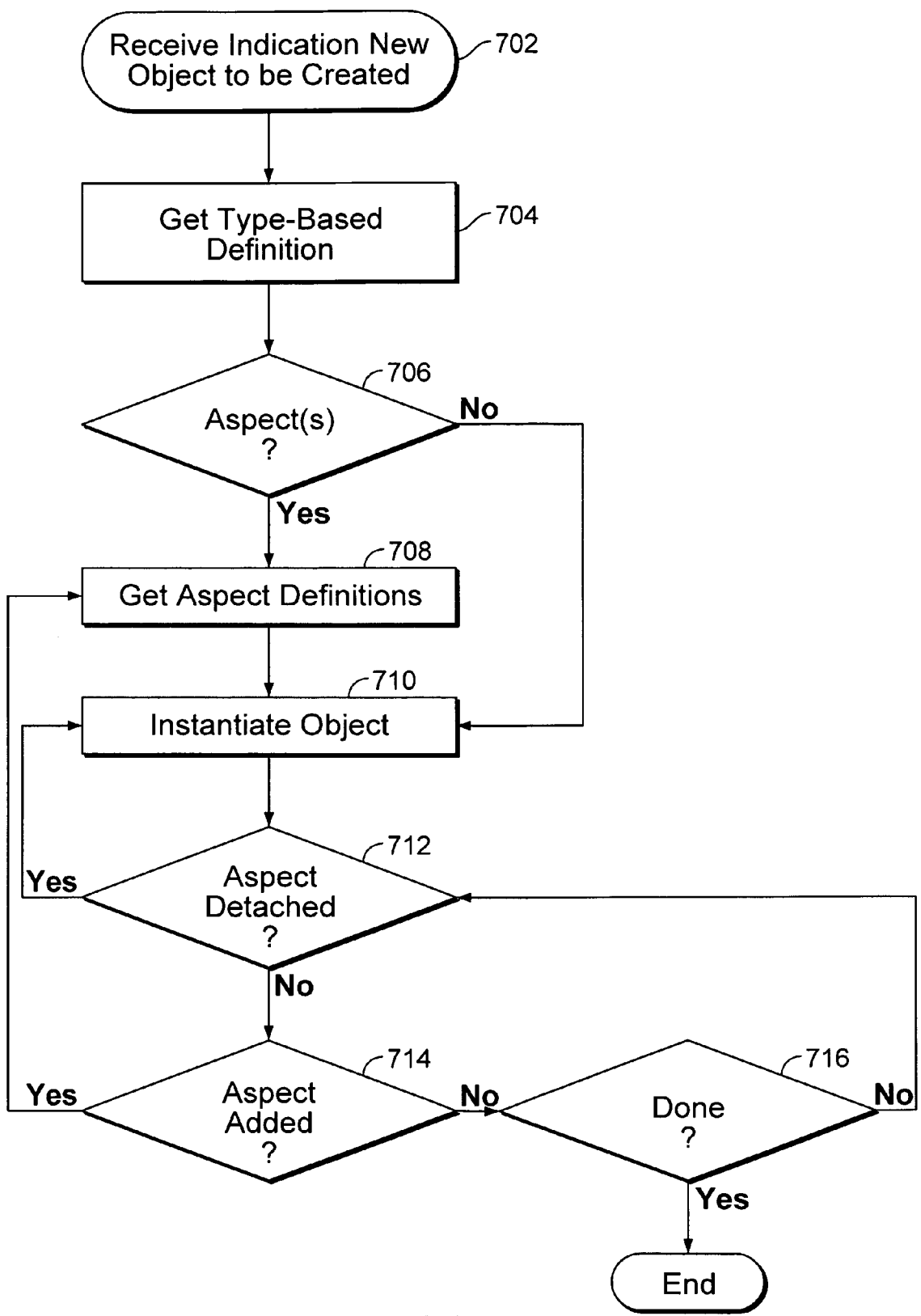
FIG. 7 is a flow chart illustrating an embodiment of a process for providing and updating, as applicable, an implementation object to be used to represent and manage an item of managed content.

FIG. 7 is a flow chart illustrating an embodiment of a process for providing and updating, as applicable, an implementation object to be used to represent and manage an item of managed content. At 702 an indication is received that an implementation object is to be created to represent and/or manage an item of content. In some embodiments, 702 includes receiving at a content system a request from an application running on a content management framework to store a new (or a new version, etc., of) a content item. In some embodiments, the indication received at 702 includes and/or is associated with data that indicates one or more of the following: a content type, one or more aspects to be attached at instantiation, and data values for one or more attributes of the implementation object to be created. At 704, a type-based definition, if applicable, is obtained, e.g., based on a content type indicated or otherwise determined for the content item, e.g., based on its location, authoring application, user or application supplied data, etc. At 706, it is determined whether any aspect(s) is/are to be attached to the implementation object at instantiation. Aspects to be attached at instantiation may be indicated by a context in which an indication to create a new object is generated and/or received, a location in which the content items is located and/or is to be stored, an explicit indication by the requesting user or application, etc. If no aspects are to be attached at instantiation, at 710 the implementation object is instantiated with generic and, if applicable, type-based behaviors. If one or more aspects are to be attached at instantiation, at 708 corresponding aspect definitions are obtained (e.g., read) and the definitions are used at 710 to attach the aspect behaviors in addition to and/or in place of corresponding generic and, if applicable, type based behaviors. The attached aspects may include methods, attributes, or both. Once the original implementation has been instantiated at 710, no further action being taken unless/until an indication is received that an aspect is to be removed (712) or added (714). In this example, if an aspect is to be removed the implementation object (but in some embodiments not an associated proxy object or other user handle) is re-instantiated with the behavior(s) (e.g., methods and/or attributes) associated with the aspect omitted (712 and 710). If an aspect is attached after original instantiation of the implementation object (714), in this example a corresponding aspect definition is obtained (708) and the implementation object re-instantiated (710) with behaviors associated with the newly attached aspect added. The process of FIG. 7 ends when an indication is received that the implementation object is no longer subject to having aspects added or removed (716), e.g., because the implementation object and associated content are no longer needed, no longer subject to change (e.g., retention), and/or have been deleted.

Figure 8:
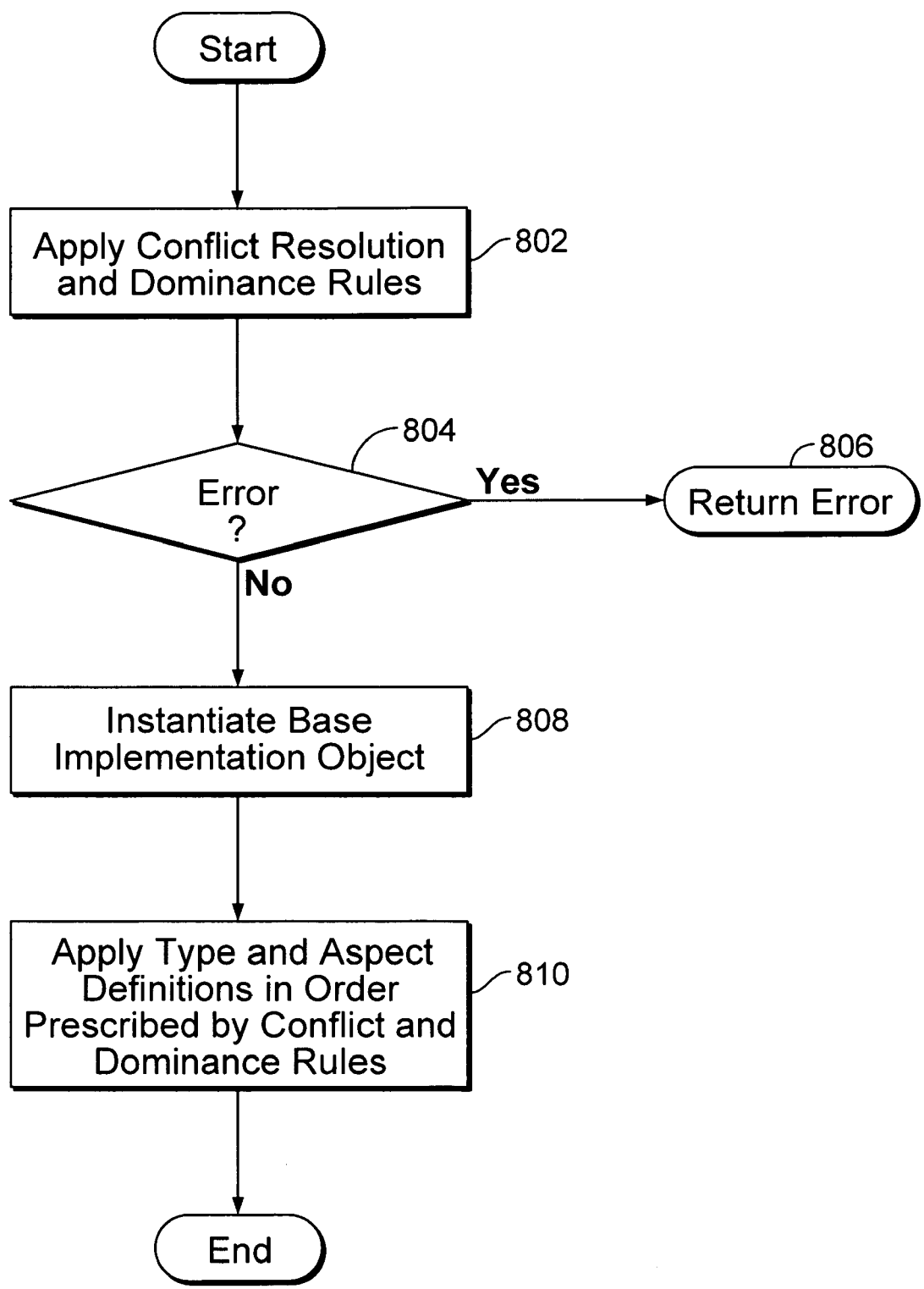
FIG. 8 is a flow chart illustrating an embodiment of a process for instantiating an implementation object.

FIG. 8 is a flow chart illustrating an embodiment of a process for instantiating an implementation object. In some embodiments, 710 of FIG. 7 includes the process of FIG. 8. At 802, conflict resolution and dominance rules are applied to determine whether indicated type-based and attached behaviors are compatible and, if so, an order for applying them. If an ambiguity (circular or otherwise inconsistent dominance rules) or conflict (two aspects from the same group or affecting the same method in incompatible ways) are detected (804), at 806 an error is returned, e.g., a dialog informing a user/administrator of the ambiguity and/or conflict and/or prompting a user/administrator to resolve an ambiguity and/or conflict. If no error is detected at 804, at 808 a base (generic) implementation object is instantiated. At 810, type-based and attached (aspect) behaviors are applied to the implementation object in a manner and/or order prescribed by the applicable conflict resolution and/or dominance rules determined at applied at 802. In some embodiments, byte manipulation of a generic implementation object is used to apply type-based and attached behaviors at 810. In some embodiments, 810 comprises forming a composite object that implements type-based and attached behaviors as well as behaviors (methods and/or attributes) of the generic implementation object that have not be modified, deleted, or replaced by an added type-based and/or attached behavior. In some embodiments, 810 includes configuring a proxy to expose zero or more new interfaces associated with type-based and/or attached behaviors.

FIGS. 9A-11B illustrate examples of attaching, removing, and/or enforcing/providing behaviors associated with aspects. These examples are provided for purposes of illustration only and should not be construed to limit the application of the approaches described and claimed herein to any particular context or use.

Figure 9A:
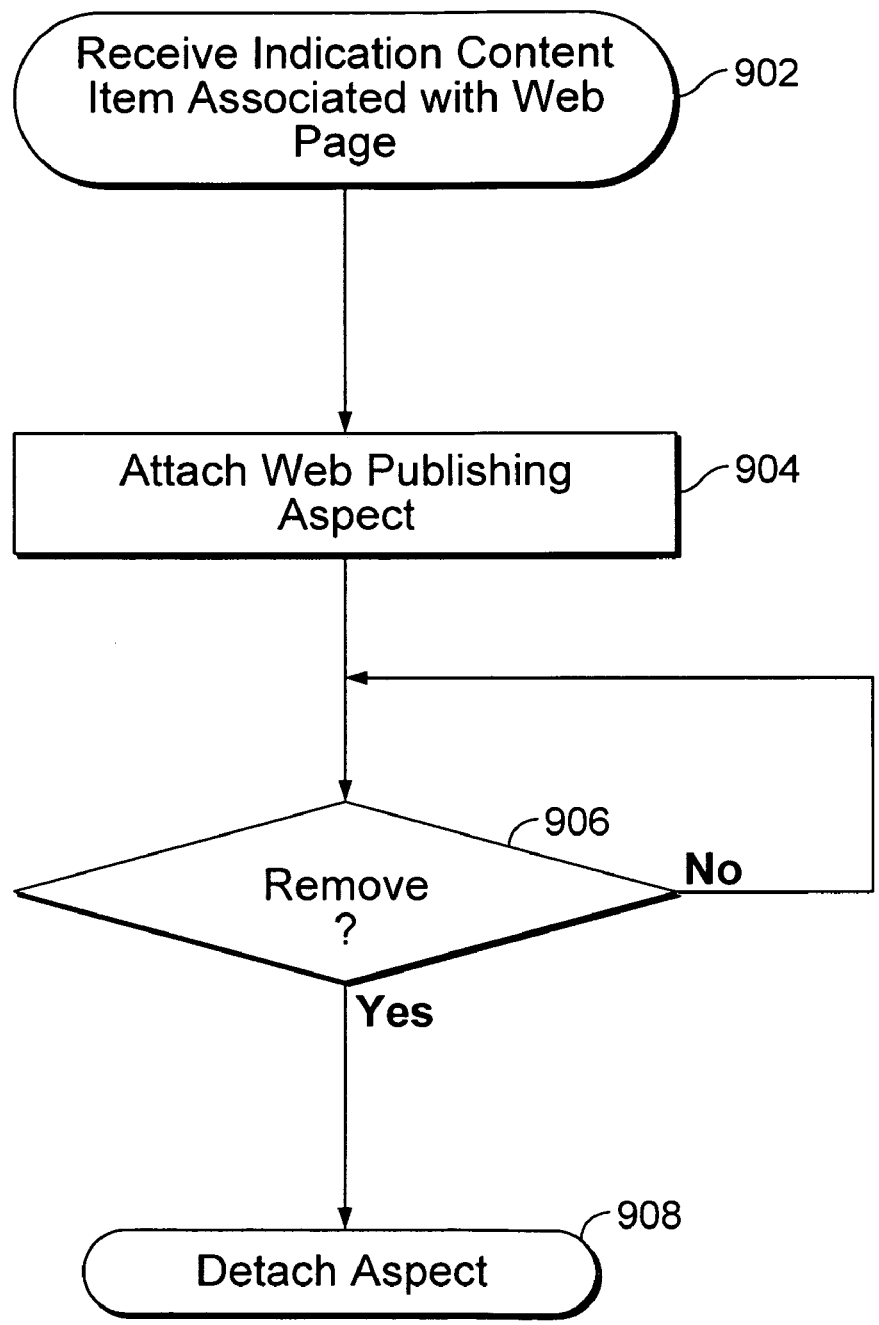
FIG. 9A is a flow chart illustrating an embodiment of a process for attaching/removing an aspect in a web publishing context.

FIG. 9A is a flow chart illustrating an embodiment of a process for attaching/removing an aspect in a web publishing context. In the example shown, at 902 an indication is received that a content item is associated with a web page. In various embodiments, the indication may be explicit (based on data provided by a user, authoring application, etc., or an input provided by a user through a user interface, to indicate that the content item is associated with the web page) or implicit (e.g., by virtue of the content item be stored in and/or linked to a folder or other object or location). At 904, a web publishing aspect is attached to the content item. In some embodiments, the web publishing aspect is attached at 904 regardless of the content type of the content item. In some embodiments, as described below in connection with FIG. 9B, the web publishing aspect results in an html rendition being generated each time the content item is saved (or checked in, versioned, etc., depending on how the aspect is defined and/or configured in a particular embodiment), regardless of the content type, native data/file format, authoring application, etc. of the content item. The aspect remains attached unless/until an indication is received that it should be removed (906), in which case the aspect is removed and the process ends (908).

Figure 9B:
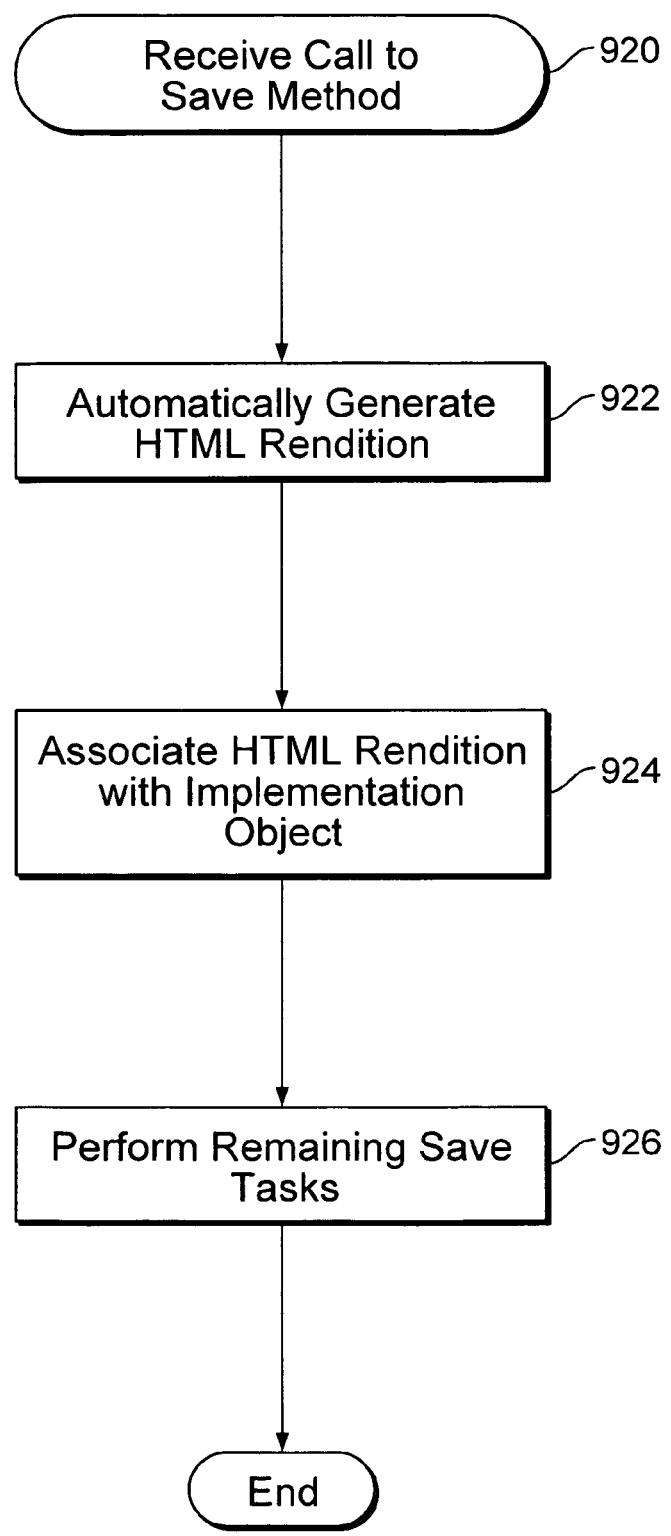
FIG. 9B is a flow chart illustrating an embodiment of a process for providing a behavior associated with an aspect in a web publishing context.

FIG. 9B is a flow chart illustrating an embodiment of a process for providing a behavior associated with an aspect in a web publishing context. At 920, a call is received to a "save" method associated with an implementation object to which a web publishing aspect has been attached. At 922, an html rendition of a content item with which the implementation object is associated is generated. At 924, the html rendition is associated with the implementation object and/or a web page with which the implementation object is associated. At 926 remaining save tasks, if any, such as saving a primary rendition generated and/or provided using an authoring application used to create and/or modify the content item, are performed, after which the process ends.

Figure 10A:
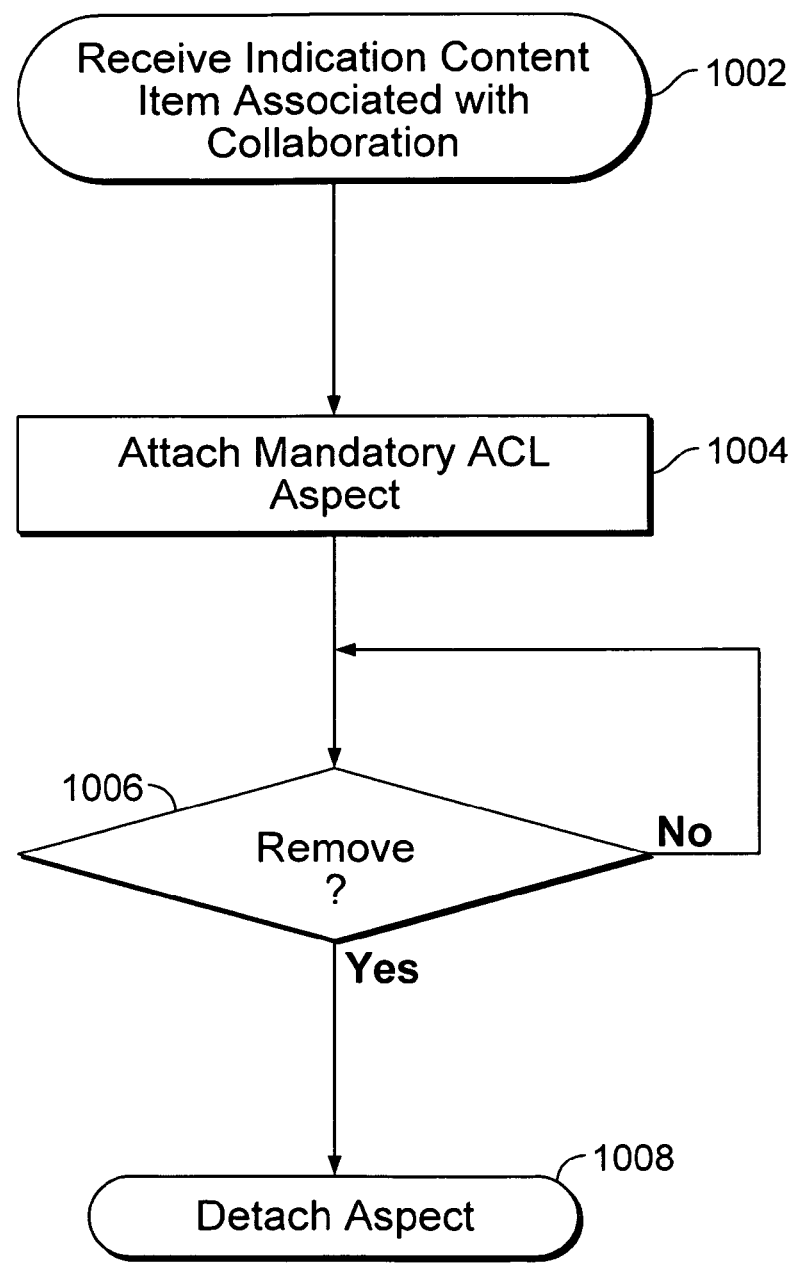
FIG. 10A is a flow chart illustrating an embodiment of a process for attaching/removing an aspect in a virtual collaboration space environment.

FIG. 10A is a flow chart illustrating an embodiment of a process for attaching/removing an aspect in a virtual collaboration space environment. Virtual collaboration spaces have been provided to enable users to collaborate with respect to a project. In some cases, content items included in a body of managed content may be used, created, modified, etc. in the course of such a collaboration. In some embodiments, access to a content item that is "governed" by a collaboration space is limited to members of the collaboration space, and is denied even to users who would otherwise have access to the content item (e.g., by virtue of their role and/or specifically assigned user rights, such as their presence on an access control list the members of which would otherwise have access to the content item) within the body of managed content but for the fact that the item has come to be governed by the collaboration space. At 1002, an indication is received that a content item is associated with a collaboration space. In some embodiments, the indication is explicit, e.g., a user indicating via a user interface that the content item is to be governed by the collaboration space access rules. In some embodiments, the indication is implicit, e.g., the fact that the content item was authored and/or checked in, ingested, and/or imported into the managed content system at a time when the user was accessing managed content through the collaboration space, or the user linked the content item to a folder of content items governed by the space (e.g., by dragging an icon or other data representing the content item and dropping it in/on a folder icon or other image/region associated with content items governed by the collaboration space rules. At 1004, a mandatory access control list (ACL) aspect is attached to the content item. In some embodiments, a mandatory ACL aspect modifies and/or supplements normal methods for accessing a content item, e.g., by modifying and/or configuring an implementation object associated with the content item and configured to represent and manage the content item within a body of managed content, to ensure that only members of the collaboration (i.e., those listed on the mandatory ACL associated with the collaboration space) are permitted to access the content item. In the example shown, the mandatory ACL aspect remains attached unless/until an indication is received that it should be removed (1006), e.g., an indication that the content item is no longer associated with and/or to be governed by the collaboration space, in which case the aspect is detached (1008) and the process of FIG. 10A ends.

Figure 10B:
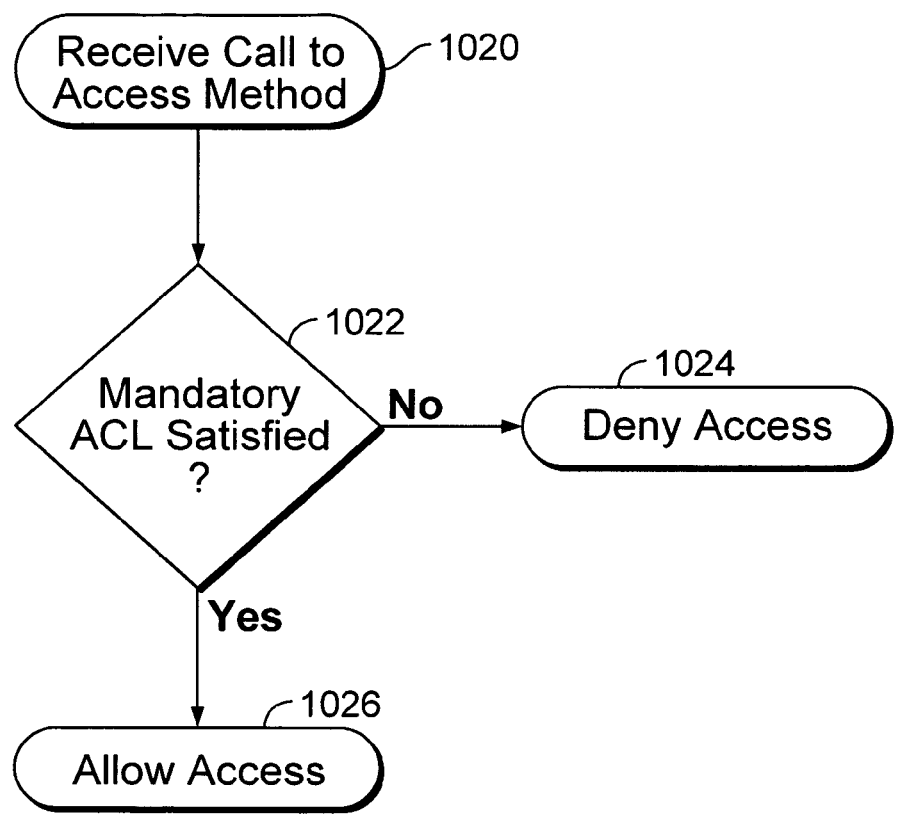
FIG. 10B is a flow chart illustrating an embodiment of a process for providing a behavior associated with an aspect in a collaboration space context.

FIG. 10B is a flow chart illustrating an embodiment of a process for providing a behavior associated with an aspect in a collaboration space context. In the example shown, at 1020 a call to an access method associated with a content item under collaboration space governance is received. In some embodiments, an aspect attached to the content item caused the method as made available via an instance, associated with the content item, of an implementation object used to represent and manage the content item within a body of management content to be modified as required to ensure that access is permitted only to members of the associated collaboration space. At 1022, it is determined whether a collaboration space associated mandatory ACL is satisfied, i.e., whether the user requesting access is on the mandatory ACL. If the mandatory ACL is not satisfied, at 1024 access is denied (even if the user is one who would otherwise have been allowed to access the content item, had the mandatory ACL aspect not be attached). If the mandatory ACL is satisfied (1022), access is permitted at 1026. In some embodiments, depending on how the aspect is defined, access is permitted at 1026 only if other criteria are satisfied, e.g., the role and/or individually delegated/specified rights of the user indicate the user should be allowed to have access. In the latter embodiments, the mandatory ACL supplements other access controls, and is a necessary but not necessarily sufficient condition to gaining access to content governed by a collaboration space. In some embodiments, this approach ensures a user who happens to be a member of a collaboration space is not given access to content they should not be permitted to access for other reasons, e.g., because they do not have a sufficiently high security clearance, etc. Other examples of the use of aspects to enforce access controls include aspects that permit a user to access a content item from some locations but not others (e.g., in the office, but not remotely), controls that limit access to content associated with a region with which a particular user is associated, and controls that permit a user to review content on screen but not print, email, save to disk, etc.

Figure 11A:
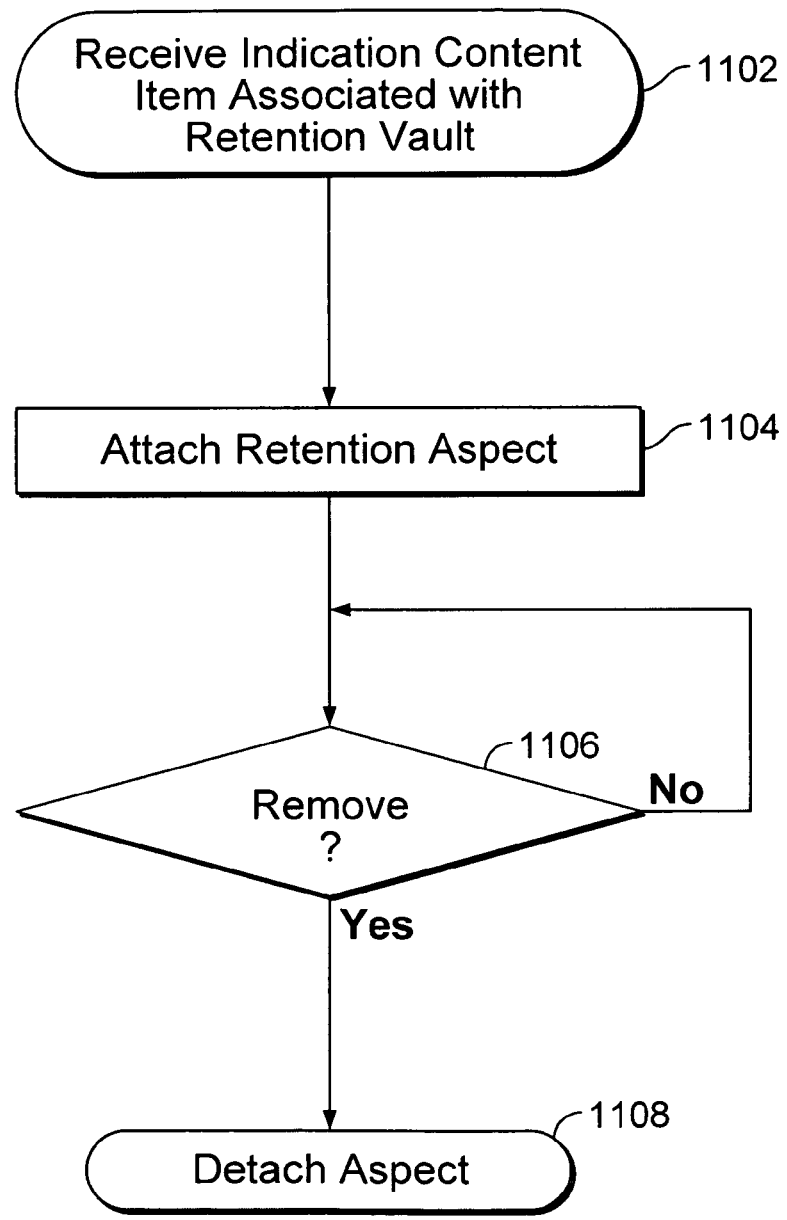
FIG. 11A is a flow chart illustrating an embodiment of a process for attaching/removing an aspect for data retention policy enforcement.

FIG. 11A is a flow chart illustrating an embodiment of a process for attaching/removing an aspect for data retention policy enforcement. In the example shown, at 1102 an indication is received that a content item is associated with a retention policy or requirement, e.g., by virtue of a representation of the content item being dragged and dropped in or other sent or linked to and/or associated with a folder, vault, container, or other logical structure with which a retention policy is associated. At 1104, an aspect configured to implement and/or enforce retention with respect to the content item is attached to an implementation object associated with the content item. In the example shown, the aspect remains attached unless/until an indication is received that it should be removed (1106), in which case the aspect is removed (1108) and the process ends.

Figure 11B:
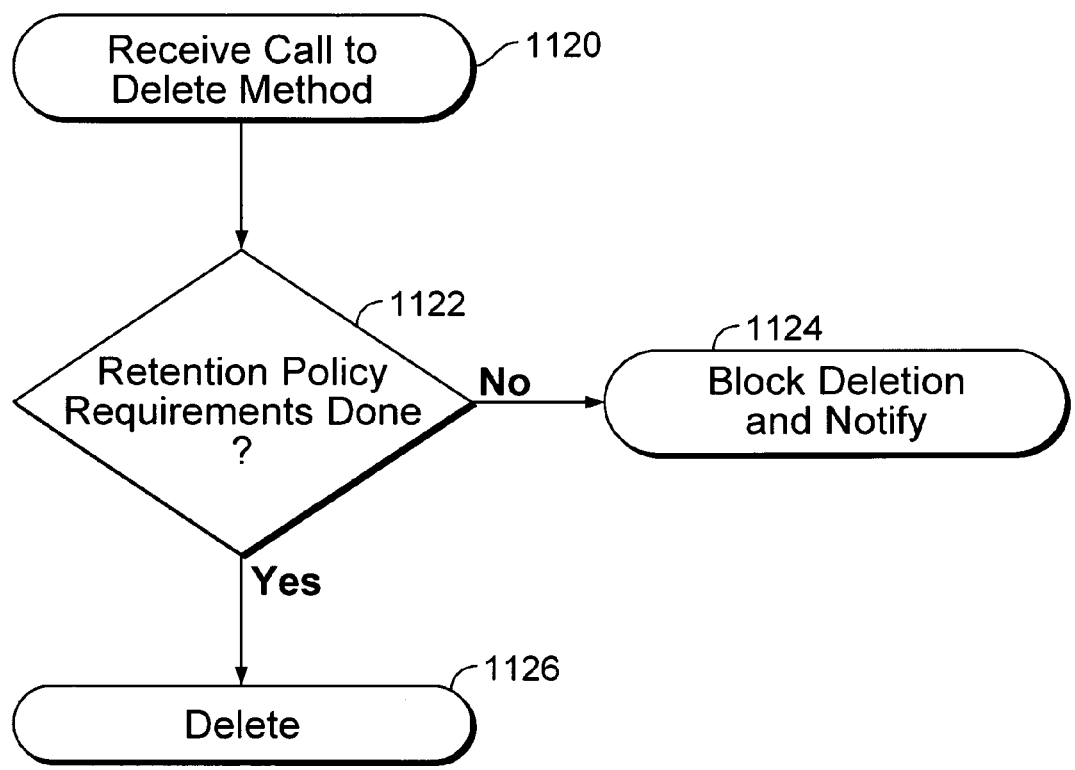
FIG. 11B is a flow chart illustrating an embodiment of a process for providing a behavior associated with an aspect in a retention policy enforcement context.

FIG. 11B is a flow chart illustrating an embodiment of a process for providing a behavior associated with an aspect in a retention policy enforcement context. At 1120, a call to a delete method is received. At 1122, it is determined whether applicable retention policy requirements allow deletion to occur. In some embodiments, a retention aspect as described in connection with FIG. 11A modifies the delete method of an implementation object associated with the content item to perform a check, prior to allowing deletion to proceed as normal, to determine whether the content item remains under retention. In various embodiments, 1122 includes checking to determine if a retainer object is linked to the implementation object and/or a folder or other logical structure with which the content item is associated; determining whether a retention period applicable to the content item has expired, e.g., by comparing a date the content item was create, received, sent, modified, etc., with the current date and comparing the difference to a retention period defined by an applicable policy; and checking to determining whether a litigation, employment, regulatory, or other "hold" has been placed on the content item. If an applicable retention policy requirements precludes deletion (1122), at 1124 the attempt to delete the content item is blocked and a notification sent, e.g., to an administrator, the requesting user, or both. Otherwise, at 1126 the content item is allowed to be deleted, e.g., by permitting the remaining parts of a generic (or type-based) "delete" method to execute.

By attaching an "aspect" or other attached behavior on an instance-by-instance (or a designated set of instances) basis, and modifying individual implementation objects corresponding to content items to which an aspect or other behavior is attached, behaviors (methods, attributes, or both) that are not type-specific may be applied across and/or within content types without requiring application level logic to enforce or provide the behaviors. This approach saves the application developer work, avoids introducing errors (e.g., by the application developer and/or in/by application code), and ensures the behaviors are enforced or provided across applications.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing content, comprising:
receiving an indication that a behavior that is not a default behavior associated with all content items or a default behavior of content items of a content type with which a content item is associated is to be provided with respect to the content item; and
using a processor to configure an implementation object instance associated with the content item to provide the behavior;
wherein
the implementation object instance comprises an instance of an object class associated with the content type;
the default behaviors comprise methods defined by the object class;
the behavior the implementation object instance is configured to provide modifies, replaces, deletes, or is provided in addition to one or more methods defined by the object class;
the implementation object represents the content item in a body of metadata; and
configuring the implementation object instance to provide the behavior enables the behavior to be provided with respect to the content item without requiring application level code configured to implement the behavior.

2. A method as recited in claim 1, wherein the indication comprises one or more of the following: an explicit indication, an implicit indication, an event, an application context, arrival of a point in a lifecycle of the content item, an indication provided via a user interface, arrival or completion of a step in a business process, and an indication that the content item has been placed in or otherwise associated with a folder or other logical structure.

3. A method as recited in claim 1, wherein the behavior comprises a method.

4. A method as recited in claim 1, wherein the behavior comprises a method and to configure the implementation object instance to provide the behavior comprises configuring the implementation project to provide the method.

5. A method as recited in claim 1, wherein the behavior comprises a modification or extension of a pre-existing method.

6. A method as recited in claim 1, wherein the content item is one of a plurality of content items with which the behavior is or has been associated.

7. A method as recited in claim 6, wherein the plurality of content items comprises content items of two or more different content types.

8. A method as recited in claim 6, wherein the plurality of content items comprises fewer than all content items of the type with which the content item is associated.

9. A method as recited in claim 1, wherein the implementation object comprises a system object used to represent and manage the content item within a body of managed content.

10. A method as recited in claim 9, wherein the methods of the implementation object are invoked through and executed by a content management platform with which the content item is associated.

11. A method as recited in claim 1, wherein to configure an implementation object instance associated with the content item to provide the behavior includes instantiating a generic implementation object and modifying the generic object to provide the behavior.

12. A method as recited in claim 1, wherein the indication is received after an original implementation object associated with the content item has been instantiated and to configure the implementation object instance associated with the content item to provide the behavior includes re-instantiating the implementation object in a form configured to provide the behavior.

13. A method as recited in claim 12, wherein the behavior has a new interface associated with it and the method further includes exposing the new interface.

14. A method as recited in claim 1, further comprising receiving an indication that the behavior is no longer associated with the content item and configuring the implementation object instance associated with the content item to no longer provide the behavior.

15. A method as recited in claim 1, further including receiving a definition associated with the behavior.

16. A method as recited in claim 15, wherein to configure the implementation object instance associated with the content item to provide the behavior includes receiving or accessing a behavior definition associated with the behavior.

17. A method as recited in claim 1, wherein to configure the implementation object instance associated with the content item to provide the behavior obviates at least in part a need to provide application level code that provides the behavior with respect to the content item.

18. A method as recited in claim 1, further comprising determining that the behavior is compatible with one or more of the following: an associated generic behavior, a content type-based behavior, a second behavior that is being or is indicated to be attached concurrently with the behavior, and a previously-attached behavior.

19. A method as recited in claim 1, further comprising determining that the behavior dominates one or more of the following: an associated generic behavior, a content type-based behavior, a second behavior that is being or is indicated to be attached concurrently with the behavior, and a previously-attached behavior.

20. A system for managing content, comprising:
a processor; and
a memory configured to store instructions which, when executed by the processor, configure the processor to:
    receive an indication that a behavior that is not a default behavior associated with all content items or a default behavior of content items of a content type with which a content item is associated is to be provided with respect to the content item; and
    configure an implementation object instance associated with the content item to provide the behavior;
wherein
    the implementation object instance comprises an instance of an object class associated with the content type;
    the default behaviors comprise methods defined by the object class;
    the behavior the implementation object instance is configured to provide modifies, replaces deletes, or is provided in addition to one or more methods defined by the object class;
    the implementation object represents the content item in a body of metadata; and
    configuring the implementation object instance to provide the behavior enables the behavior to be provided with respect to the content item without requiring application level code configured to implement the behavior.

21. A computer program product for managing content, the computer program product being embodied in a computer readable storage medium and comprising computer instructions for:
    receiving an indication that a behavior that is not a default behavior associated with all content items or a default behavior of content items of a content type with which a content item is associated is to be provided with respect to the content item; and
    configuring an implementation object instance associated with the content item to provide the behavior;
wherein
    the implementation object instance comprises an instance of an object class associated with the content type;
    the default behaviors comprise methods defined by the object class;
    the behavior the implementation object instance is configured to provide modifies, replaces, deletes, or is provided in addition to one or more methods defined by the object class;
    the implementation object represents the content item in a body of metadata; and
    configuring the implementation object instance to provide the behavior enables the behavior to be provided with respect to the content item without requiring application level code configured to implement the behavior.

22. A system as recited in claim 20, wherein to configure the implementation object associated with the content item to provide the behavior comprises instantiating a generic implementation object and modifying the generic object to provide the behavior.

23. A system as recited in claim 20, wherein the indication is received after an original implementation object associated with the content item has been instantiated and configuring the implementation object instance associated with the content item to provide the behavior includes re-instantiating the implementation object in a form configured to provide the behavior.

24. A computer program product as recited in claim 21, wherein configuring the implementation object instance associated with the content item to provide the behavior includes instantiating a generic implementation object and modifying the generic object to provide the behavior.

25. A computer program product as recited in claim 21, wherein the indication is received after an original implementation object associated with the content item has been instantiated and configuring the implementation object instance associated with the content item to provide the behavior includes re-instantiating the implementation object in a form configured to provide the behavior.

26. A method as recited in claim 1, wherein to configure an implementation object instance associated with the content item to provide the behavior comprises applying conflict resolution and dominance rules to determine whether the behavior is compatible with the default behaviors.

27. A method as recited in claim 1, wherein to configure an implementation object instance associated with the content item to provide the behavior comprises applying conflict resolution and dominance rules to determine an order to apply the behavior with the default behaviors, if the behavior is compatible with the default behaviors.

* * * * *